United States Patent [19]
Harp et al.

[11] Patent Number: 5,495,203
[45] Date of Patent: Feb. 27, 1996

[54] EFFICIENT QAM EQUALIZER/DEMODULATOR WITH NON-INTEGER SAMPLING

[75] Inventors: Jeffrey C. Harp, Los Altos; Lee Snyder, San Jose; Ernest Tsui, Cupertino, all of Calif.

[73] Assignee: Applied Signal Technology, Inc., Sunnyvale, Calif.

[21] Appl. No.: 349,174

[22] Filed: Dec. 2, 1994

[51] Int. Cl.$^6$ ............................................. H04L 27/38
[52] U.S. Cl. .................... 329/306; 329/307; 348/641; 348/727; 375/261; 375/266; 375/328
[58] Field of Search ........................... 329/304, 305, 329/306, 307, 310; 375/324, 326, 327, 328, 261, 266; 348/641, 726, 727

[56] References Cited

U.S. PATENT DOCUMENTS 4,594,555  6/1986  Hilton ...................... 329/306

OTHER PUBLICATIONS

Vaidyanathan, P. P., "Multirate Systems and Filter Banks," Prentice Hall Signal Processing Series, Alan V. Oppenheim, Series Editor, pp. 120–125, 1993.

Primary Examiner—Siegfried H. Grimm
Attorney, Agent, or Firm—Townsend and Townsend and Crew

[57] ABSTRACT

A QAM demodulator that samples an IF input modulated with data at a fractional complex sampling rate between one and two times the data rate. The use of a fractional sampling rate significantly reduces the number of components necessary to implement the demodulator, particularly in the equalizer section of the demodulator which corrects for channel distortion. The fractional sampling rate demodulator architecture of the invention provides a significant reduction in integrated circuit surface area needed in a VLSI implementation.

14 Claims, 11 Drawing Sheets

FIR OPERATION

EFFICIENT QAM EQUALIZER/DEMODULATOR WITH NON-INTEGER SAMPLING

BACKGROUND OF THE INVENTION

The present invention relates generally to demodulators for digital communication and particularly to demodulator design for modulation schemes that employ in-phase and quadrature components.

In the context of digital communication, demodulators must recover data which has been transmitted by modulating a generally sinusoidal signal. Demodulator design is specific to the modulation scheme employed. In a typical application, the input to a demodulator is a modulated signal received via a transmission medium and downconverted by well-known mixing techniques to a fixed intermediate frequency (IF). The demodulator output is a stream of symbols which represent estimates of the transmitted data.

Error correction techniques as well as data decompression may be applied to the demodulator output but certain error sources such as channel echoing and accompanying intersymbol interference must be at least partially removed by the demodulator. Furthermore, the demodulator must synchronize its operation to the transmitted data.

Newly adopted digital television standards envision the application of QAM (Quadrature Amplitude Modulation) to the commercial broadcast of high-resolution video images over cable transmission media for reception by consumer equipment. The standards anticipate data rates commensurate with commercial cable channel bandwidths, yet the necessary QAM demodulators must be sufficiently inexpensive for incorporation into consumer receiver equipment.

SUMMARY OF THE INVENTION

The invention provides a QAM demodulator which samples an IF input modulated with data at a non-integer complex sampling rate between one and two times the modulation symbol rate. The QAM demodulator of the invention represents an improvement over prior art digital demodulators that typically sample an input signal at an integer multiple of the symbol rate, namely once or twice per symbol. The fractional sampling rate, being greater than the symbol rate, is sufficiently high to recover the underlying data. The use of a non-integer sampling rate enables the invention to provide matched filtering of the signal using less arithmetic processing than would be required at a sampling rate of twice per symbol. For a VLSI implementation of the QAM demodulator, this reduction in processing translates into significant reductions in integrated circuit surface area.

In accordance with the invention, the particular sampling rate is carefully chosen in accordance with defined relationships to the IF center, the IF channel bandwidth, the signal symbol rate, and the bandwidth of the transmitted signal. Particular relationships among these parameters are necessary for the successful operation of one embodiment of the invention.

According to a first aspect of the invention, the QAM demodulator incorporates a digital resampler for synchronizing the sample rate to an exact predetermined non-integer multiple of the symbol rate. The resampler interpolates the demodulated signal by a variable factor N and then decimates the resulting signal by a fixed factor M to produce the resampled signal. A control loop recovers the data rate from the resampled signal and adjusts the variable interpolation rate N to control the resampling rate to be the desired fraction of the symbol rate. In accordance with the invention, N need not be an integer and the control loop is specially adapted to operate with a resampling rate which is not an integer multiple of the symbol rate.

According to a second aspect of the invention, the QAM demodulator incorporates an adaptive equalizer which in addition to correcting for channel distortion, also resamples the demodulated signal to a rate of one sample per symbol to facilitate symbol decisions. In one embodiment, optimized for use in a 1.2 sample-per-symbol system, the adaptive equalizer includes an FIR filter that sequences through five distinct sets of coefficients. Five output samples are produced for every six samples input to the equalizer, realizing the required downsampling rate of 5/6.

The invention provides a significant advantage over prior art QAM demodulators in that the non-integer sampling rate minimizes the number of FIR filter taps, and therefore multipliers, necessary to correct for channel echoes while still meeting the Nyquist criterion. Further advantages are provided by the fully digital implementation and resulting elimination of most analog components of the demodulator.

The invention will be better understood by reference to the following detailed description in connection with the accompanying drawings.

DESCRIPTION OF SPECIFIC EMBODIMENTS

Modulation Overview

In any modulation scheme employing in-phase and quadrature components, the transmitted modulation signal over a period of duration T may be represented by the expression $$M(t)=A*\cos(2pi,t/T)+B*\sin(2pi,t/T) \quad (1)$$

or as a similar sum of an alternate pair of orthogonal waveforms. The period T is known as a symbol period and 1/T is defined to be the baud rate, $F_B$. Data is communicated by selecting during each symbol period one of a limited number of permissible (A,B) vectors or symbols. Various quadrature modulation schemes differ in the number, N, of possible symbols and the relative values of the (A,B) vectors corresponding to each possible symbol. Generally, the number, N, of possible symbols is an integer power of 2. Each transmitted symbol then communicates a unique string of $\log_2 N$ bits.

Figure 1:
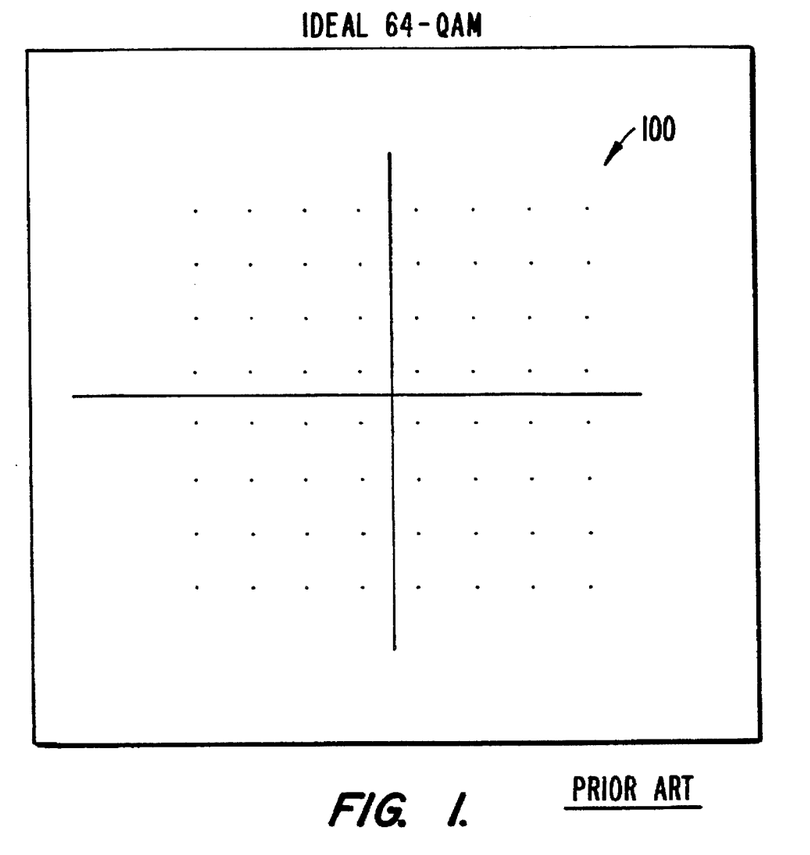
FIG. 1 depicts a so-called signal constellation representing 64-point QAM (Quadrature Amplitude Modulation)

FIG. 1 depicts a so-called signal constellation 100 representing 64 point QAM (Quadrature Amplitude Modulation), one known type of modulation. A signal constellation is a graphical representation of the possible symbols for a given modulation scheme. The horizontal and vertical axes correspond to the orthogonal components of the modulation signal. Each possible symbol is represented by a point at the position of its associated (A,B) coordinates. As shown in FIG. 1, 64 point QAM is represented as an array of 64 points. Since $\log_2(64)=6$, the choice of one particular symbol for transmission during a given symbol period communicates six bits of information.

Many other signal constellations are possible. For example, other variants of QAM also have array signal constellations but with various numbers of points. For QPSK (quadrature phase shift key) modulation, the four points of the signal constellation are arranged in a circle having the origin as a center.

A QAM Digital Communication Link

Figure 2:
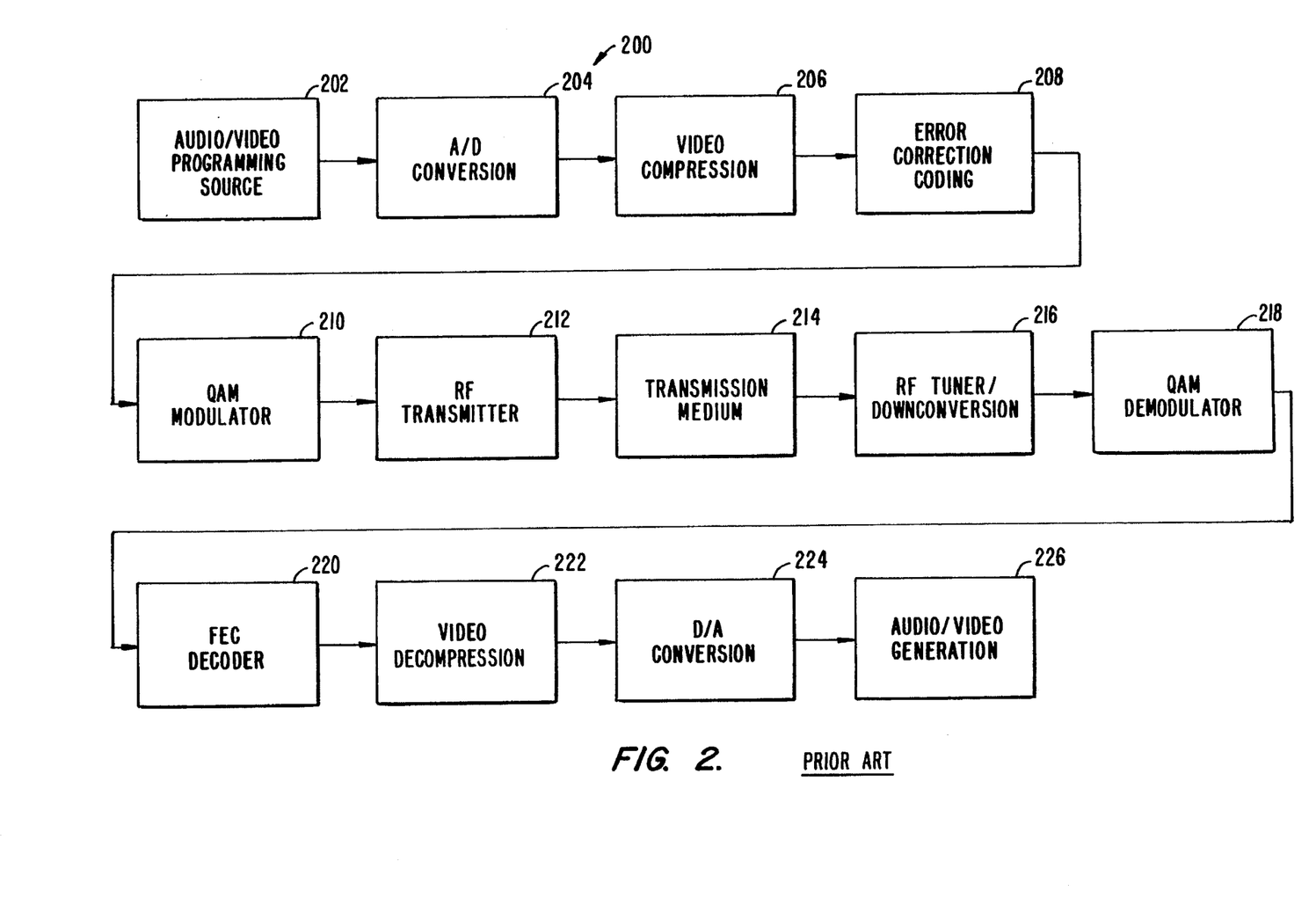
FIG. 2 depicts the architecture of a typical data communication link for transmitting and receiving audio/video data using 64 point QAM.

FIG. 2 depicts the architecture of a typical data communication link 200 for transmitting and receiving audio/video data using 64 point QAM (64-QAM). The data communication link 200 includes an audio/video programming source 202, an A/D conversion stage 204, video compression stage 206, an error correction coding stage 206, a QAM modulator 210, an RF transmitter 212, a transmission medium or distribution system 214, an RF/down conversion stage tuner 216, a QAM demodulator 218, an FEC (forward error correction) decoder 220, a video decompression stage 222, a D/A conversion stage 224, and finally an audio/video generation stage 226 for displaying the received data.

Audio/video programming source 202 may represent real-time capture of audio/video information by camera, microphone, etc., retrieval from recording media, or the receipt of audio/video information from another source. A/D conversion stage 204 represents the conversion of analog audio/video information to digital form. Video compression stage 206 compresses video data in accordance with a selected video compression standard such as MPEG-2. Error correction coding stage 208 then encodes the compressed data to facilitate error correction at the receiver. Possible error correction encoding schemes include convolutional codes, Reed-Solomon codes, and interleaved Reed-Solomon codes.

The compressed and encoded data is then input to QAM modulator 210. QAM modulator 210 groups the data into six bit long strings which translate directly to the symbols marked as points on signal constellation 100. QAM modulator 210 then creates the modulation signal in accordance with equation (1).

The propagation characteristics of transmission medium 214 as well as spectral availability generally preclude the direct transmission of the modulation waveform. Therefore, RF transmitter 212 uses well known techniques to upconvert the modulation waveform to a suitable frequency for transmission across transmission medium 214 as a radio frequency (RF) signal and provides filtering to satisfy channel bandwidth requirements for distribution through a coaxial cable network. A suitable transmission frequency might be in the range 50 MHz to 1 GHz. RF transmitter 212 also amplifies the RF signal prior to transmitting across transmission medium 214. Transmission medium 214 may represent a coaxial cable CATV network, a terrestrial wireless communication channel, or a satellite communication link.

RF tuner/downconversion stage 216 downconverts the RF signal to a fixed intermediate frequency (IF). The job of QAM demodulator 218 is to extract the transmitted symbols from the IF waveform. FEC decoder 220 then applies knowledge of the codes applied by error correction coding stage 208 to remove the coding while correcting for errors introduced by the link. Video decompression stage 222 essentially reverses the compression routines applied by video compression stage 206. D/A conversion stage 224 converts the decompressed digital data to analog signals which can then be used to control the operation of audio/video generation system 226.

The task of QAM demodulator 218 is complicated by transmission errors introduced by the link. Transmission medium 214 introduces noise causing the constellation points to disperse from their ideal locations marked in FIG. 1. Transmitter filtering and echoing effects within transmission medium introduce inter-symbol interference (ISI) which must be removed by equalization. Also, RF tuner/downconversion stage 216 introduces residual frequency offset which causes the constellation points to "spin" about the origin. FEC decoder stage 220 helps improve link performance in the presence of noise but inter-symbol interference and residual frequency offset should be addressed within QAM demodulator 218. QAM demodulator 214 must also somehow synchronize to the transmitted data.

A Prior Art QAM Demodulator

Figure 3:
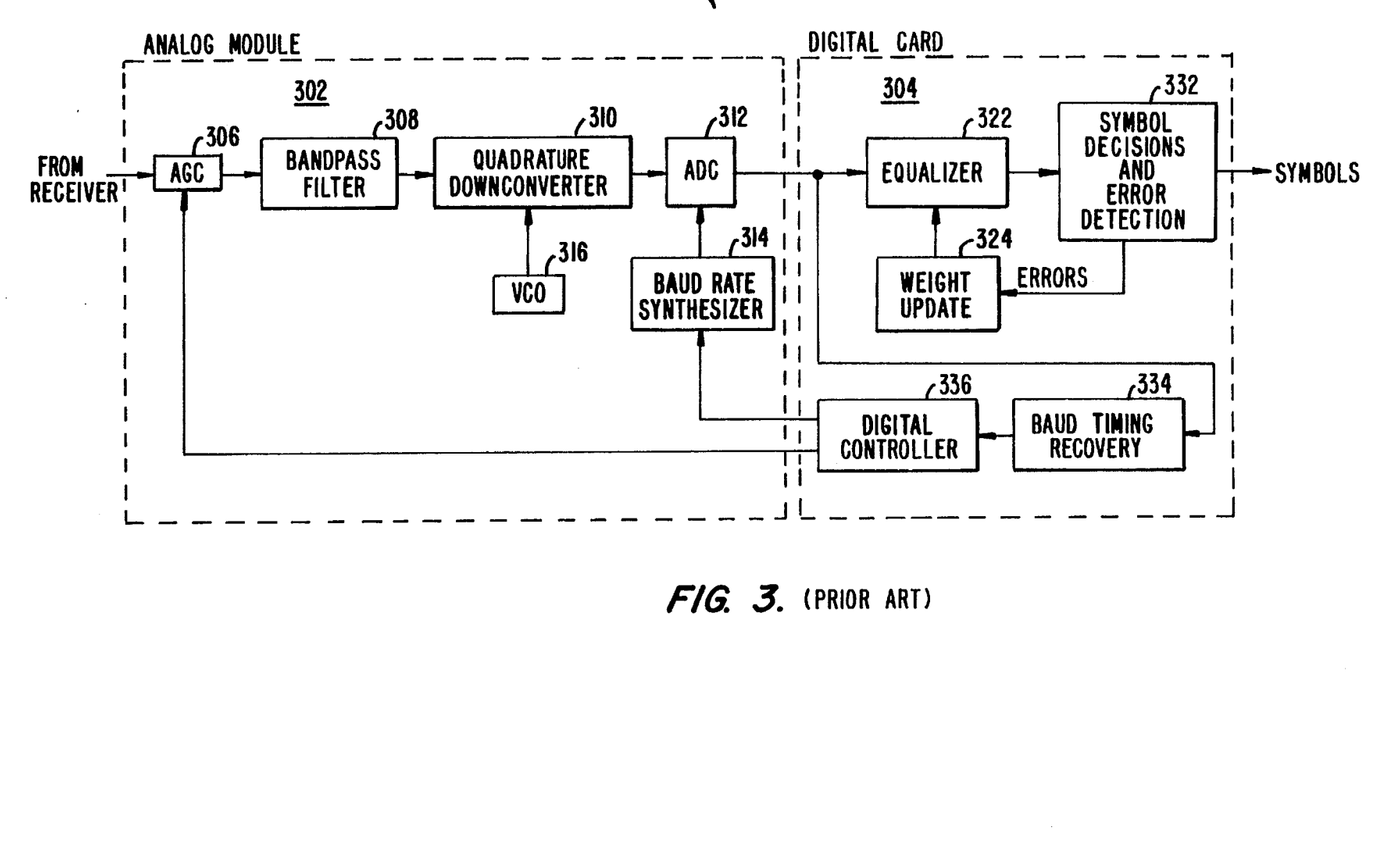
FIG. 3 depicts a typical QAM demodulator of the prior art.

FIG. 3 represents a typical QAM demodulator 300 of the prior art. The depicted demodulator is a simplified representation of the Model 255A manufactured by the assignee of this application. The components of prior art QAM demodulator 300 are divided between an analog module 302 and a digital card 304.

Analog module 302 includes an automatic gain control circuit (AGC) 306, a bandpass filter 308, a quadrature downconverter 310, an A/D converter 312, a baud rate synthesizer 314, and a VCO 316 which serves as the local oscillator for the quadrature downconverter 310. Digital module 304 includes an equalizer 322, a weight update circuit 324, a symbol decision and equalizer error determination circuit 332, a baud timing recovery circuit 334, and a digital controller 336.

In operation, bandpass filter 308 receives through AGC 306 a signal that has already been downconverted to an IF center frequency. Bandpass filter 308 attenuates components outside a fixed bandwidth surrounding the IF center frequency. The filtered signal is quadrature downconverted by quadrature downconverter 310. The resulting in-phase and quadrature baseband signals are filtered to remove any IF input and/or feedthrough from local oscillators employed in the downconversion process. At this point, the baseband signal still has a residual carrier component (carrier offset). The quadrature analog signal is sampled baud-synchronously at typically 2 samples per symbol. Baud synthesizer 314 operates as the sampling clock and operates in conjunction with baud timing recovery circuit 334 and digital controller 336 to synchronize the samples to the transmitted symbols.

All of the signal processing following the analog module 302 is performed digitally at a rate synchronous with the baud rate. The sampled signals provide 2 samples (both in-phase and quadrature) per symbol to baud timing recovery circuit 334 and equalizer 322. Baud timing recovery circuit 334 produces a filtered tone having a frequency which is the difference between half the current sampling rate and the symbol rate as recovered from the sampled signal. Digital controller 336 derives an error signal which drives a phase lock loop which in turn produces a clock rate control signal for baud rate synthesizer 314.

Equalizer 322 comprises a programmable transversal filter VLSI chip set. Weight adaptation circuit 324 updates the equalizer coefficients using terms derived from the input data and from an error signal generated by equalizer error determination circuit 332.

The equalizer output signal has a small amount of residual carrier offset. If one were to view in-phase and quadrature signals at the output of equalizer 322 represented as a signal constellation, this offset would be apparent as spinning of the constellation around the origin at a rate equivalent to the offset between the actual IF center frequency present at the input to quadrature downconverter and the downconversion 310 frequency generated by VCO 316. Carrier removal is accomplished by means of a digital phase-lock loop contained within symbol decision and error detection circuit 332.

Symbol decision circuit 328 employs a look-up-table to translate the equalized de-spun data to symbol decisions which represent estimates of the transmitted data. The circuitry also has the capability to perform differential decoding on the symbol stream.

Prior art demodulator 300 incorporates numerous VLSI ICs to perform digital processing. The equalizer 322 particularly requires extensive hardware to incorporate a sufficient number of FIR filter taps to correct for channel distortion. Furthermore, since the signal is downconverted to baseband prior to sampling, quadrature downconversion circuit 310 and VCO 316 must necessarily incorporate analog circuitry requiring careful matching of component gain and phase. The prior art demodulator is therefore unsuitable for low-cost consumer applications such as commercial digital television reception.

The QAM Demodulator of the Invention

Figure 4:
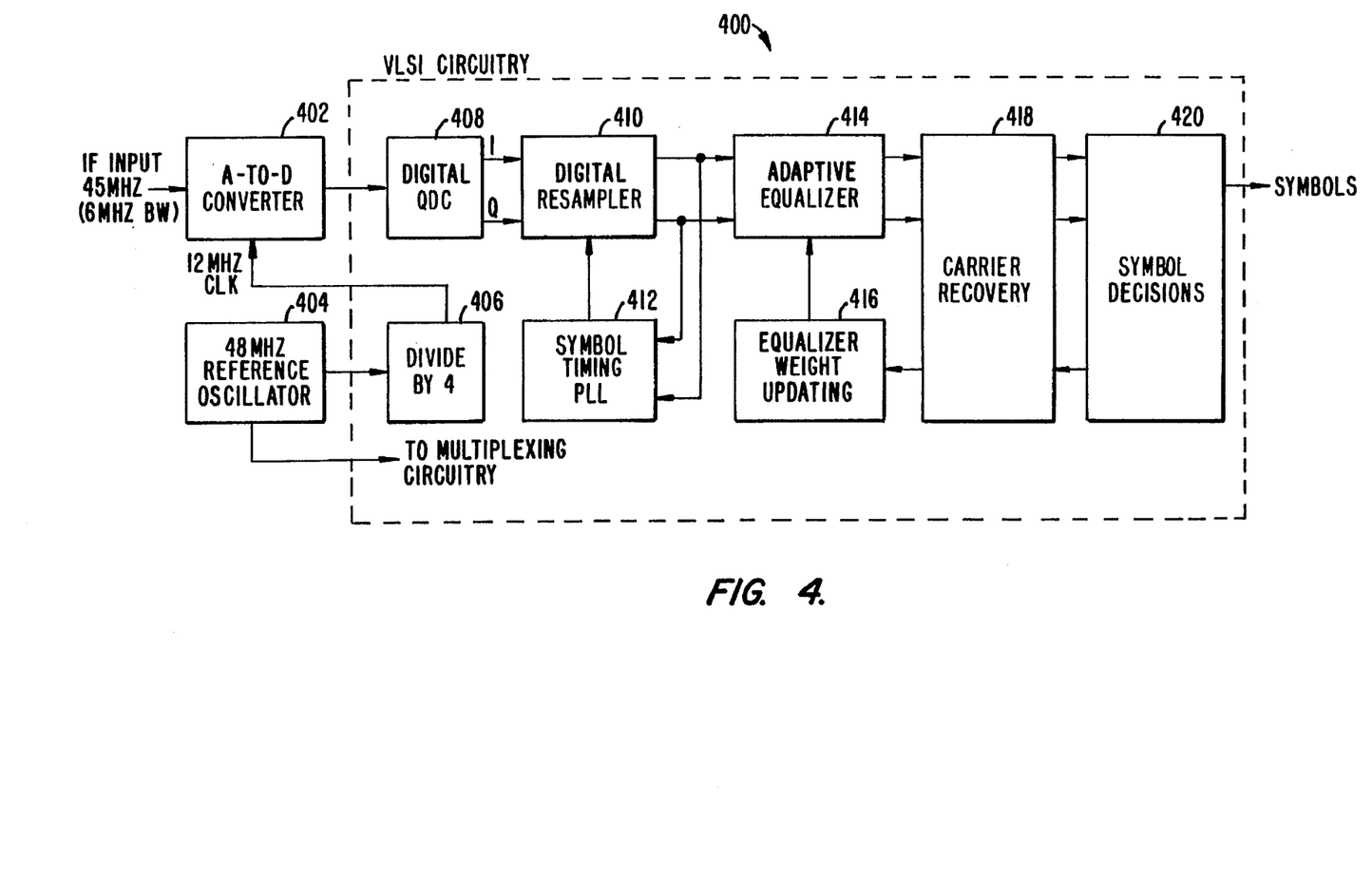
FIG. 4 depicts the top-level architecture of a QAM demodulator in accordance with the invention.

FIG. 4 depicts the top-level architecture of a QAM demodulator 400 in accordance with the invention. QAM demodulator 400 includes an A-D converter 402, a reference oscillator 404, a divide-by-4 circuit 406, a digital quadrature direct conversion stage 408, a digital resampler 410, a symbol timing phase-lock loop 412, an adaptive equalizer 414, an equalizer weight updating stage 416, a carrier recovery stage 418, and a symbol decision stage 420.

A unique aspect of the invention is the selection of the digital sampling rate based upon the IF bandwidth and center frequency and the signal symbol rate and transmission bandwidth. This selection enables the quadrature conversion operation to be performed digitally without any explicit multiplications and leads to a complex sampling rate, generally less than two samples per symbol, which enables the demodulator to perform matched filtering and equalization of the signal using the fewest possible number of equalizer taps. The rationale for selecting the sampling rate is described first in general terms and then is explained by means of a specific example using FIGS. 5–8. The first step is to sample the real IF signal using a technique known as bandpass sampling. Bandpass sampling occurs at a rate $\hat{F}_s$, an approximation of the ultimate sampling frequency $F_s$, that must be at least twice the signal transmission bandwidth. This sampling frequency will generally be much less than the IF with the result that the input signal pass band will be aliased to appear as a real signal with a frequency content between 0 and ½ the sampling frequency. The new sampled, real, IF will be shifted (aliased) by an amount $-N \times \hat{F}_s$, where N is the integer value which places the sampled spectrum between 0 and ½ $F_s$.

By careful selection of $\hat{F}_s$, it may be assured that the aliased spectrum is an undistorted replica of the input spectrum, that it is not aliased upon itself by "folding" about either 0 or $\hat{F}_s/2$. The value of $\hat{F}_s$ should also be chosen so that the center of the aliased signal spectrum is located roughly in the middle of the Nyquist sampling bandwidth at $\approx \pm \hat{F}_s/4$. This facilitates the direct digital quadrature conversion described later. If the input signal bandwidth is $BW_{SIG}$, the input IF center is $F_{IF}$ and the aliased center frequency is $F_A$, then the sampling frequency $\hat{F}_s$ may be determined by the following relationships;

$$F_A \approx \pm \hat{F}_s/4, \text{ and} \quad (2)$$

$$F_A = F_{IF} - N \times \hat{F}_s, \text{ which leads to} \quad (3)$$

$$\hat{F}_s \approx F_{IF}/(N \pm \frac{1}{4}). \quad (4)$$

N is chosen to be the largest integer so that $\hat{F}_s \geq 2 \times BW_{SIG}$. These conditions will assure that the sampling rate is high enough to provide matched filtering of the signal and will enable a simplified digital technique to be used for quadrature conversion. The ultimate sampling frequency, $F_s$, is chosen so that $F_s/2 \times F_B$ may be expressed as the ratio of two integers. This facilitates the subsequent synchronization of the sampling rate to exactly $F_s$ and the equalization and resampling of the signal to once per symbol.

The following description provides a numerical example of the forgoing explanation. The parameters are fairly typical of proposed digital cable television systems. The IF is centered at 45 MHz and is 6 MHz wide. The modulation symbol rate is 5 MHz and the signal is bandlimited to 5.5 MHz by means of a square-root-raised-cosine filter. From the preceding discussion, the sampling rate must be a minimum of 11 MHz. A sampling rate is selected which is 45/(3.75)=12 MHz. The ratio of $F_s$ to twice the symbol rate is 6/5 which satisfies the requirement for the ratio of two integers.

Figures 5, 6, 8:
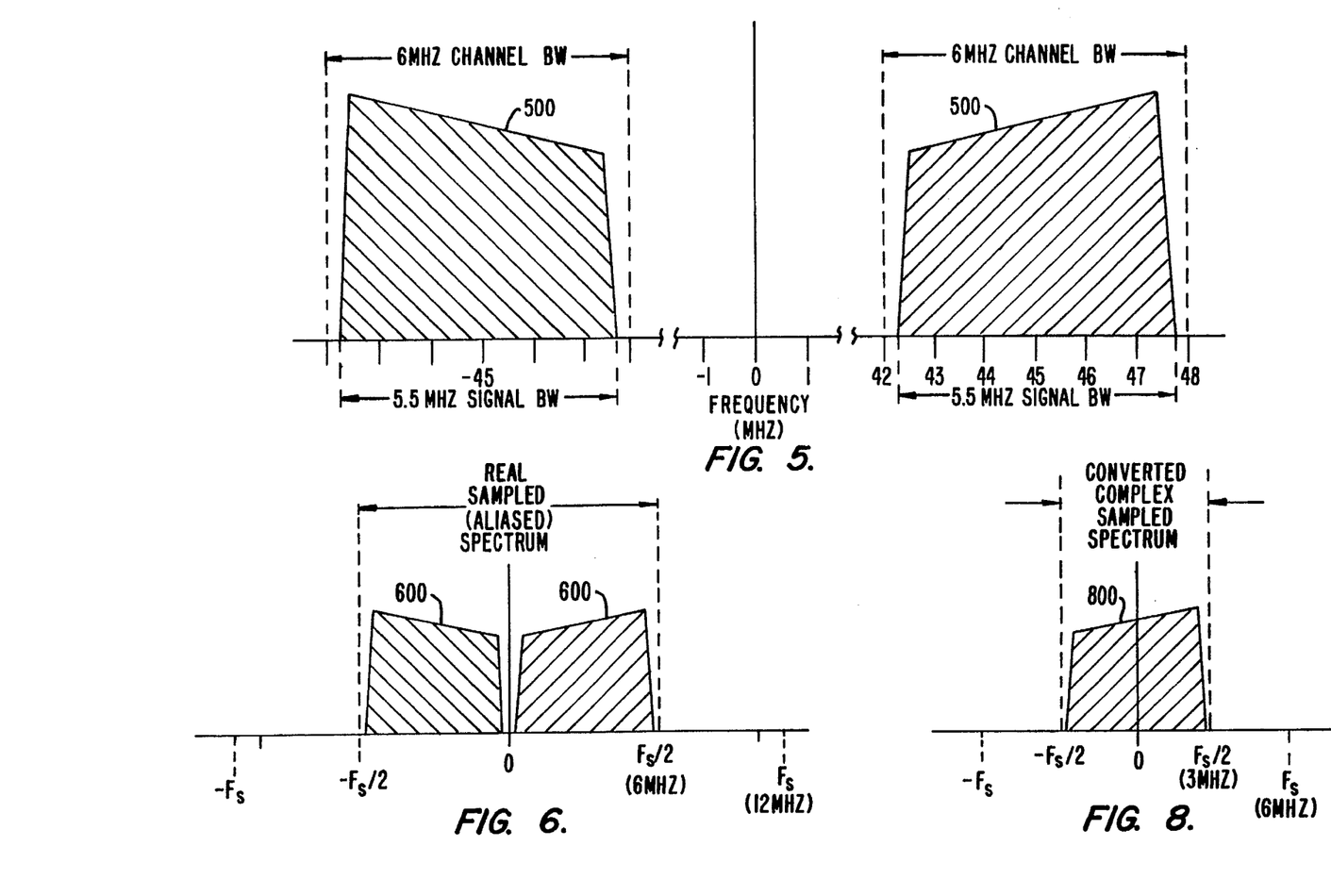
FIG. 5 depicts the spectrum of a nominal IF input signal to the demodulator of the invention.
FIG. 6 depicts the spectrum of the output of an A-D converter after bandpass sampling in accordance with the invention.
FIG. 8 depicts the complex sampling spectrum as shifted to 0 Hz by the quadrature direct conversion technique of the invention.

FIG. 5 depicts the spectrum of a QAM input signal 500 as received by A-D converter 402. Signal 500 has been downconverted to a 45 MHz IF and filtered to a 5.5 MHz bandwidth. The baud rate, $F_B$, of the QAM signal is 5 MHz. In accordance with the invention, A-D converter 402 bandpass samples the analog QAM signal synchronous to a 12 MHz clock signal generated by 48 MHz reference oscillator 404 in conjunction with divide-by-four circuit 406.

FIG. 6 depicts a spectrum 600 of the output of A-D converter 406. The effect of A-D conversion at this frequency is to alias the IF spectrum to a new 6 MHz band centered at 3 MHz. For this example, the aliased spectrum is inverted from the original which is inconsequential to the demodulation process. All of the remaining functional units and the divide-by-four circuit operate digitally and are implemented as a single VLSI IC.

The real sampling rate, $\hat{F}_s$, is therefore chosen to be $\approx 2.4 * F_B$ and the complex sampling rate is $\approx 1.2$ times $F_B$. Since the clock driving A-D converter 402 runs independently and does not respond to symbol transitions, these ratios are approximate.

The choice of a non-integer ratio of complex sampling rate to baud rate provides important advantages. Since the ratio is 1.2, the Nyquist criterion is satisfied for all signals with excess bandwidths of 20% or less; no information is lost during sampling. However, not setting the complex sampling rate to be as high as twice the data rate economizes on hardware in that fewer filter taps are required within equalizer 414 to correct for echoing which spans a given time period. Furthermore, since the complex sampling rate is so low as to be ⅛ of the 48 MHz master clock frequency, multipliers and other arithmetic units within demodulator 400 which operate on the sampled signal may be time-shared eight-fold.

Figure 7:
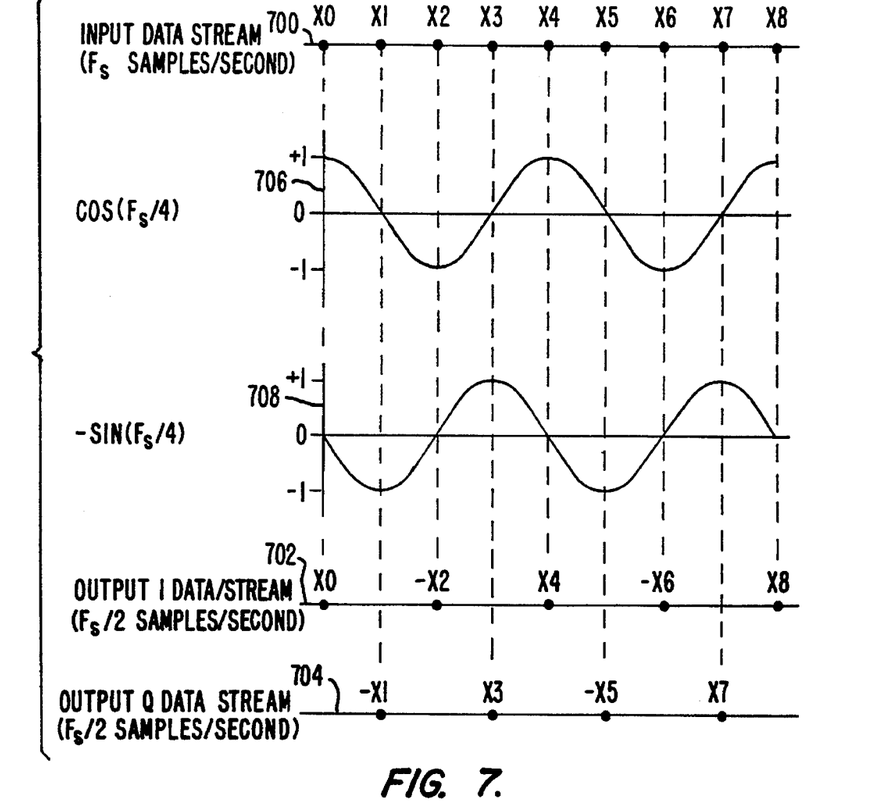
FIG. 7 depicts the operation of the quadrature direct conversion technique of the invention.

FIG. 7 depicts the time-domain operation of the quadrature direct conversion technique of the invention. The output of the A-D converter is a real signal represented by a single sample stream 700. Since all of the signal recovery and demodulation techniques use complex data, the next function of the architecture is to convert this single sample stream 700 into two quadrature sample streams, an in-phase sample stream 702 and a quadrature sample stream 704 which are centered at a nominal 0 Hz frequency. The in-phase and quadrature sample streams are herein referred to as the I-channel and Q-channel signals. FIG. 8 depicts a spectrum 800 of the signals as shifted to 0 Hz.

Mathematically, this conversion may be understood as a multiplication of the real signal by a cosine signal 704 and a sine signal 706 to produce the in-phase and quadrature signals respectively centered at 0 Hz. In accordance with the invention, the sampling frequency is advantageously chosen relative to the IF center frequency so that the effect of bandpass sampling is to center the aliased IF spectrum 600 at $F_s/4$. In other words, the IF center frequency minus an integer multiple of $F_s$ must be equal to $F_s/4$. Therefore, the sine and cosine signals used to shift the spectrum to 0 Hz themselves have a frequency of $F_s/4$. As shown in FIG. 7, if these cosine and sine signals are properly aligned to the sample stream, they are limited to the values 1, −1, and 0 at the sampling points.

Figure 9:
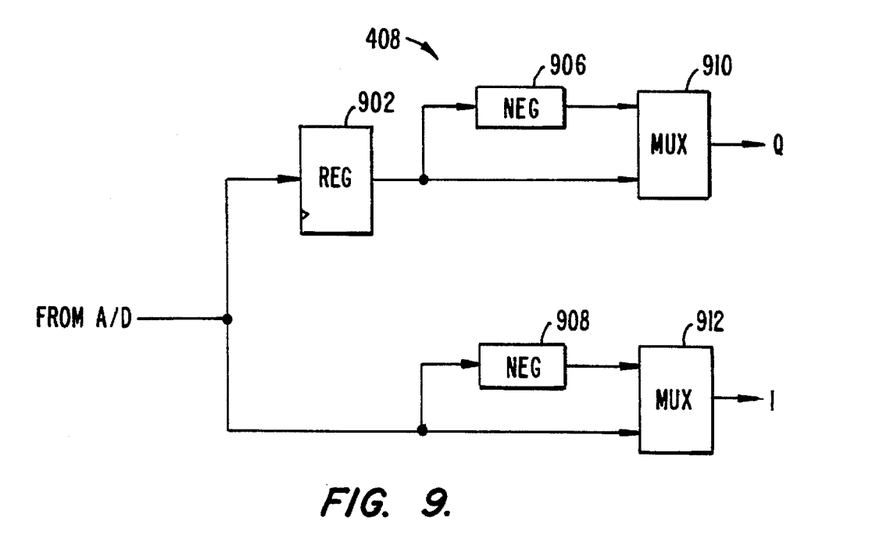
FIG. 9 depicts a quadrature direct conversion stage in accordance with the invention.

FIG. 9 depicts a representation of quadrature direct conversion stage 408 in accordance with the invention. Direct quadrature conversion stage 408 includes a Q-channel delay unit 902, a Q-channel complementing unit 906, an I-channel complementing unit 908, a Q-channel multiplexer 910, and an I-channel multiplexer 912. Direct quadrature conversion stage 408 of the invention exploits the limited range of values of the sine and cosine signals to accomplish conversion without the use of a numerically controlled oscillator, multipliers, look-up tables or other elements previously used to implement a multiplication by a sinusoid.

Q-channel delay unit 902 is a flip-flop which introduces a delay to properly stagger the I and Q channels. Q-channel multiplexer 910 selects the Q-channel samples by only outputting during alternate input sample periods. Q-channel multiplexer 910 implements a cosine multiplication by alternately selecting from the .input sample stream and a complemented version provided by Q-channel complementing unit 906. I-channel multiplexer 912 outputs during the sample periods discarded by Q-channel multiplexer 910. I-channel multiplexer 912 similarly implements a sine multiplication by alternately selecting from the input sample stream provided and a complemented version provided by I-channel complementing unit 908. The outputs of the Q-channel multiplexer 910 and the I-channel multiplexer 912 are then the Q-channel and I-channel sample streams respectively.

Since the coefficients of equalizer 414 are adapted responsive to error measurements obtained from symbol decisions, the input sample streams to equalizer 414 must have a fixed alignment to the symbols themselves. However, the samples at the output of quadrature direct conversion stage 408 are not aligned to the transmitted symbols because the clock driving A-D converter 402 runs freely. In other words the ratio of complex sampling rate to baud rate is not exactly 1.2 and the samples do not have a fixed relationship to the time-domain symbol boundaries.

Figure 10:
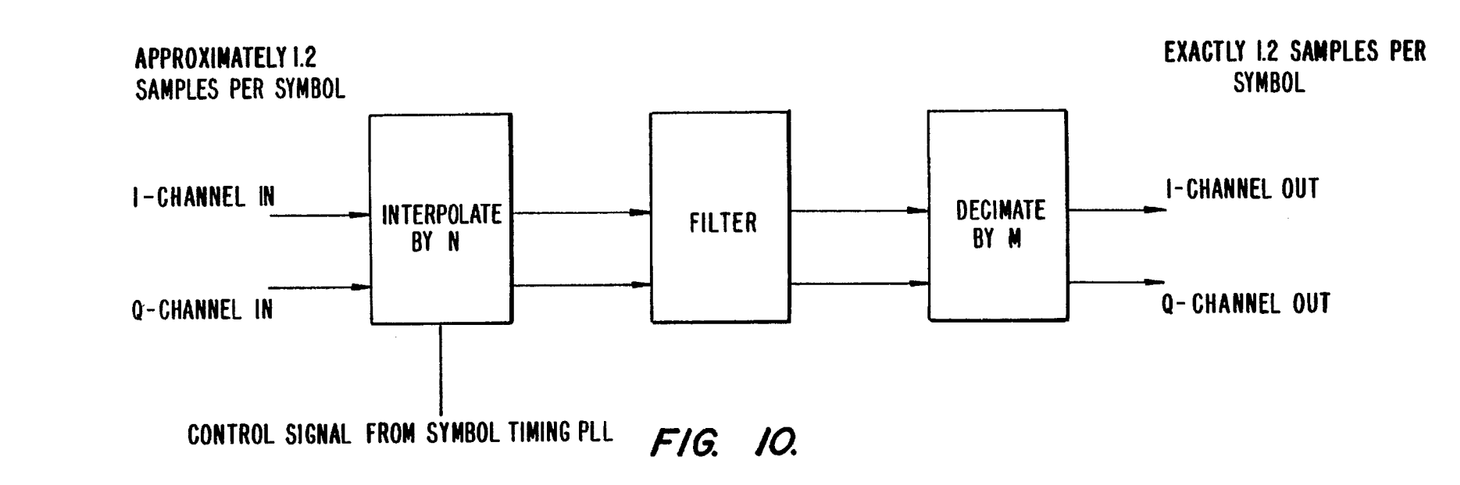
FIG. 10 depicts a digital resampler in accordance with the invention.

FIG. 10 depicts digital resampler 410 in accordance with the invention. The resampler receives data at sample rate $\hat{F}_s$ (approximately 1.2 samples/symbol) and produces an output stream sampled at $F_s$. $F_s$ is precisely 1.2 samples/symbol, responsive to control signals from symbol timing phase lock loop 412. Digital resampler 410 includes an adjustable interpolator 1000, a filter 1002, and a decimator 1004. Interpolator 1000 interpolates the I-channel and Q-channel sample streams by an adjustable factor of N by inserting N−1 zeroes between samples. Filter 1002 filters the interpolated sample streams. Decimator 1004 then decimates the filtered and interpolated sample streams by a fixed factor M. The adjustable interpolation factor N is responsive to a control signal.

In accordance with the invention, N need not be an integer. If N is not an integer, an integer interpolation factor is varied over time so that the mean factor becomes equal to N.

Symbol timing phase lock loop 412 controls the adjustable factor N so that the I-channel and Q-channel outputs of digital resampler 410 are aligned to the transmitted symbols. The complex resampling rate is therefore exactly 1.2 times the baud rate as recovered by symbol timing phase lock loop 412. Those of skill in the art will appreciate that the digital resampler could be modified to perform a downsampling function so that the input sampling rate could be an integer multiple of the symbol rate.

Figure 11:
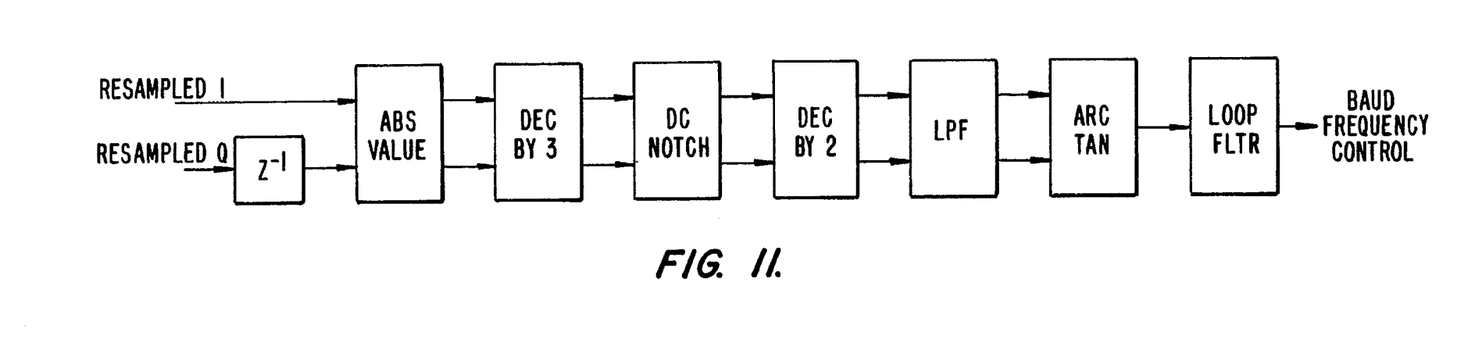
FIG. 11 depicts a symbol timing phase lock loop in accordance with the invention.

FIG. 11 depicts symbol timing phase lock loop 412 in accordance with the invention. Symbol timing phase lock loop 412 includes a delay unit 1100, an absolute value stage 1102, a decimation-by-three stage 1104, a DC notch filter stage 1106, a decimation-by-two stage 1108, a low pass filter 1110, an arctangent stage 1114, and a loop filter 1116. The resampled I-channel and Q-channel sample streams are the input to the symbol timing phase lock loop 414. Delay unit 1100 applies a one-sample delay to the Q-channel so that timing signals in the I and Q channels are in quadrature. With the exception of delay unit 1100, arctangent stage 1114 and loop filter 1116, each stage is understood to operate on both the I-channel and Q-channel sample streams. The output of symbol timing phase lock loop 412 is a control signal for varying the interpolation factor N within digital resampler 410.

Figure 12A:
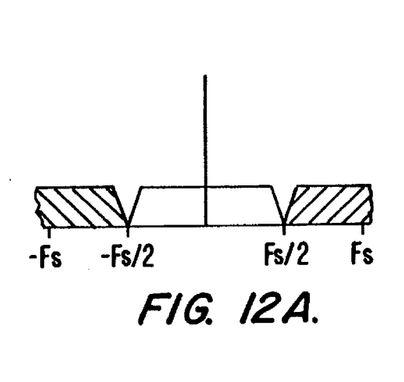
FIG. 12A depicts the frequency spectrum at the input of an absolute value stage in accordance with the invention.

FIGS. 12A–12F depict simplified representations of the frequency spectra of the signals at various points within symbol timing phase lock loop 412 in accordance with the invention. FIG. 12A depicts the frequency spectrum at the input to absolute value stage 1102. As was depicted in FIG. 8, with respect to the quadrature direct conversion stage output, this spectrum extends to $\pm F_s/2$.

Figure 12B:
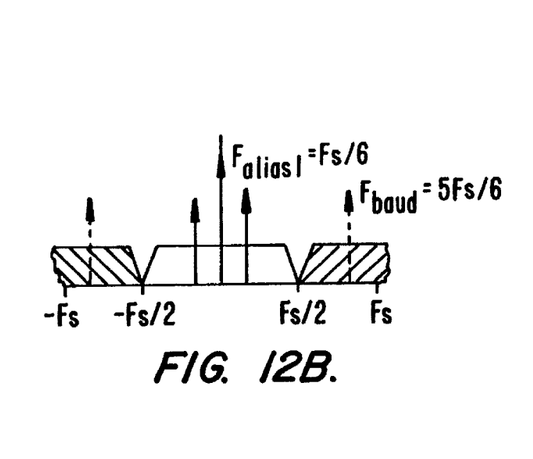
FIG. 12B depicts the frequency spectrum at the output of an absolute value stage in accordance with the invention.

FIG. 12B depicts the frequency spectrum at the output of absolute value stage 1102. The frequency domain effect of the absolute value function applied in the time domain to a data modulated signal is to introduce a spectral component at the baud rate frequency, $F_B$. FIG. 12B therefore shows peaks corresponding to the true baud rate at 5/6 and –5/6 the sampling frequency, $F_s$. These peaks are aliased by the sampling process at intervals corresponding to the sample frequency. The peaks thus are seen to appear at 1/6 and –1/6 the sampling frequency. A large DC component is also produced by the non-linear operation. Other non-linear functions may be applied instead of the absolute value to create a similar result.

Figure 12C:
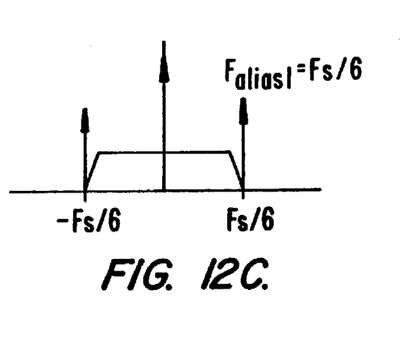
FIG. 12C depicts the frequency spectrum at the output of a decimation-by-three stage in accordance with the invention.

FIG. 12C depicts the frequency spectrum at the output of decimation-by-three stage 1104. Decimation by three in the time domain operates to rescale the frequency axes by a factor of three and to introduce aliases spaced at intervals corresponding to the new effective sampling frequency. The rescaling effects are accounted for in FIGS. 12A through 12F where the horizontal scales are labelled with reference to the original sampling frequency.

Figure 12D:
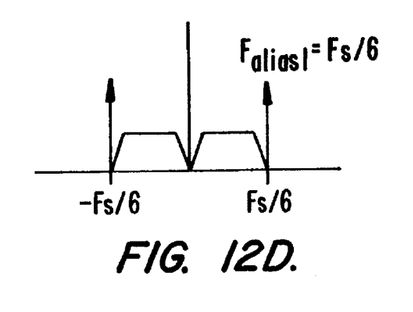
FIG. 12D depicts the frequency spectrum at the output of a DC notch stage in accordance with the invention.

FIG. 12D depicts the frequency spectrum at the output of DC notch stage 1106. The effect of DC notch stage 1106 is to attenuate the frequency spectrum within the vicinity of 0 Hz.

Figure 12E:
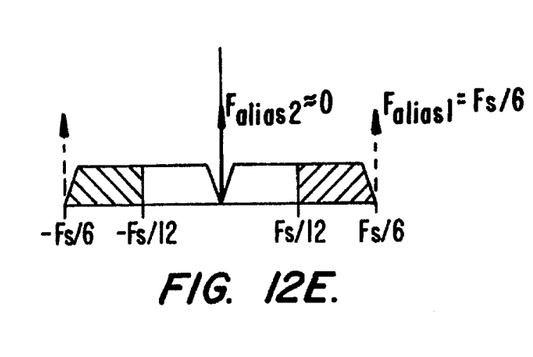
FIG. 12E depicts the frequency spectrum at the output of a decimation-by-two stage in accordance with the invention.

FIG. 12E depicts the frequency spectrum at the output of decimation-by-two stage 1108. Again, the important effect of this decimation stage is to create a further alias of the peak corresponding to the baud rate. In particular, the peak at $F_s/6$ in FIGS. 12C and FIG. 12D is aliased by the new sampling rate, $F_s/12$, to 0 Hz which is within the notch created by DC notch stage 1106.

Figure 12F:
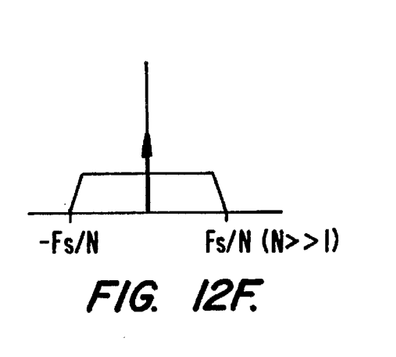
FIG. 12F depicts the frequency spectrum at the output of a lowpass filter in accordance with the invention.

FIG. 12F depicts the frequency spectrum at the output of lowpass filter 1110. Lowpass filter 1110 attenuates the high frequency components to obtain the depicted spectrum. FIG. 12F represents a situation where symbol timing phase-lock loop 412 is in lock and the resampling frequency matches 1.2*FB. If the loop is not in lock, the output of lowpass filter 1110 is a tone at a frequency corresponding to the error.

Arctangent stage 1114 calculates a phase error by evaluating the arctangent of the ratio of the Q-channel signal over the I-channel signal. Loop filter 1116 then transforms the phase error into a control signal for adjusting the variable interpolation N of resampler 410.

Of course, the arrangement and characteristics of the stages of symbol timing phase lock loop 412 could be modified within the scope of the present invention. The frequency spectra of FIGS. 12A–12F would then also change appropriately.

After resampling, the I-channel and Q-channel sample stream are next applied to adaptive equalizer 414. In accordance with the invention, equalizer 414 serves multiple purposes. One purpose of equalizer 414 is of course equalization. Equalizer 414 must remove distortions from the sample streams. These distortions result from filtering applied to the modulation at the transmitter end, and from imperfections in the transmission medium, primarily reflections or echoes.

Also, symbol decisions made subsequent to equalization require that there be 1 complex sample per symbol rather than 1.2. Equalizer 414 must therefore perform a resampling function, outputting 5 output samples for every 6 input samples.

Yet another function of equalizer 414 is correcting an artifact introduced by quadrature direct conversion stage. Referring to FIG. 7, it can be seen that the I-channel and Q-channel sample streams are misaligned by one-half of one complex sampling period. Since each symbol decision requires simultaneous I-channel and Q-channel inputs, this misalignment must be removed.

Figure 13:
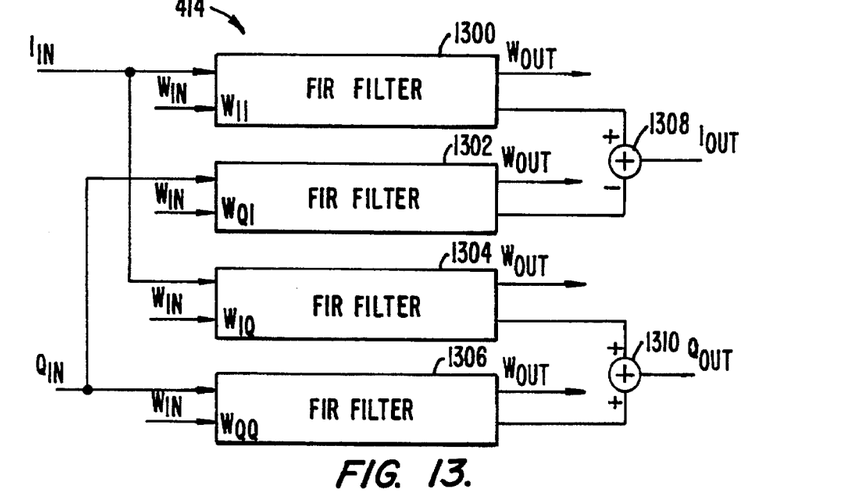
FIG. 13 depicts a simplified representation of the internal structure of an equalizer in accordance with the invention.

FIG. 13 depicts a simplified representation of the internal structure of equalizer 414 in accordance with the invention. Equalizer 414 includes first, second, third, and fourth filter structures 1300, 1302, 1304, and 1306, an I-channel summer 1308, and a Q-channel summer 1310. Each of the four filter structures represents a specially modified 20 tap FIR filter. Each of the four FIR filters has a real data input and a real data output. The aggregate of the four real filters serves to realize a single 20-tap complex filter, accepting complex data in and supplying complex data out. For adaptation purposes, each filter has an input for accepting new real coefficients and an output for presenting the old real coefficients.

The number of taps required in the filters is determined by the strength and time delays of the worst-case echoes experienced in the transmission medium. In general, for equalizer 414 to be able to mitigate the channel imperfections, FIR structures 1300, 1302, 1304, and 1306 must have a time span which exceeds the longest echo delay. The number of taps needed to cover a given time span depends in turn on the sampling rate. In the preferred embodiment, 20 taps are sufficient for processing 64 and 256-QAM signals. Note that had a sampling rate of 2 samples per symbol been chosen, 33 taps would have been required to achieve similar performance.

The four filters together represent a single 20 tap FIR filter having a complex input, a complex output and complex coefficients. Furthermore, for reasons explained below, in the preferred embodiment there are separate complex coefficients for the I-channel and Q-channel. For an FIR filter with real data and real coefficients the filter output at any particular time is the sum of the products of the content of each tapped delay element and the coefficient associated with that tapped delay element. Here, the data may be represented as the complex quantity I+jQ, the I-channel weights as WII+jWQI, and the Q channel weights as WIQ+jWQQ. Thus, in accordance with complex arithmetic, the I-channel output is I*WII–Q*WQI summed over 20 taps. The Q-channel output is I*WIQ+Q*WQQ summed over 20 taps.

Filter structure 1300 calculates I*WII summed over 20 taps and filter structure 1302 calculates Q*WQI summed over 20 taps. Summer 1308 calculates the I-channel output as the difference between the sums computed by filter structure 1300 and filter structure 1302. Similarly, filter structure 1304 calculates I*WIQ summed over 20 taps and filter structure 1306 calculates Q*WQQ summed over 20 taps. Summer 1310 calculates the Q-channel output as the sum of the sums computed by filter structure 1304 and filter structure 1306.

Figure 14:
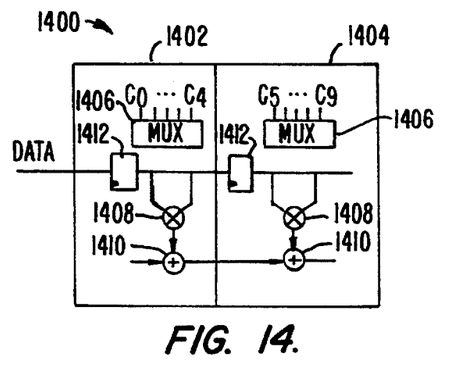
FIG. 14 illustrates a tapped delay line segment of an FIR filter structure in accordance with the invention.

FIG. 14 illustrates a tapped delay line segment 1400 of an FIR in accordance witch the invention. Tapped delay line segment 1400 represents one section of one of the FIR filters depicted in FIG. 13. Tapped delay line segment 1400 includes two tapped delay elements 1402 and 1404. Each tapped delay element includes a multiplexer 1406, a multiplier 1408, a summer 1410 and a data latch 1412. A control signal to multiplexer 1406 selects from among five coefficients for multiplication with the data currently stored in data latch 1412. The significance of this selection will be better understood with reference to FIG. 15.

The configuration depicted in FIG. 14 essentially repeats itself along the lengths of the filter structures of FIG. 13. The data latches 1412 of succeeding tapped delay elements together constitute a single shift register with the input to the shift register being the data input of the FIR. Also, the output of each summer 1410 is an input to the succeeding summer 1410, until the output of the final summer of the FIR generates the output for the FIR.

In operation, a single control signal drives the multiplexers in each of the filter tap elements in each of the filters 1300, 1302, 1304, and 1306. Equalizer 414 can also therefore be understood as five complex FIR filters which share complex data but have independent sets of coefficients. The control signal then selects which of the five complex filters is active.

Figure 15:
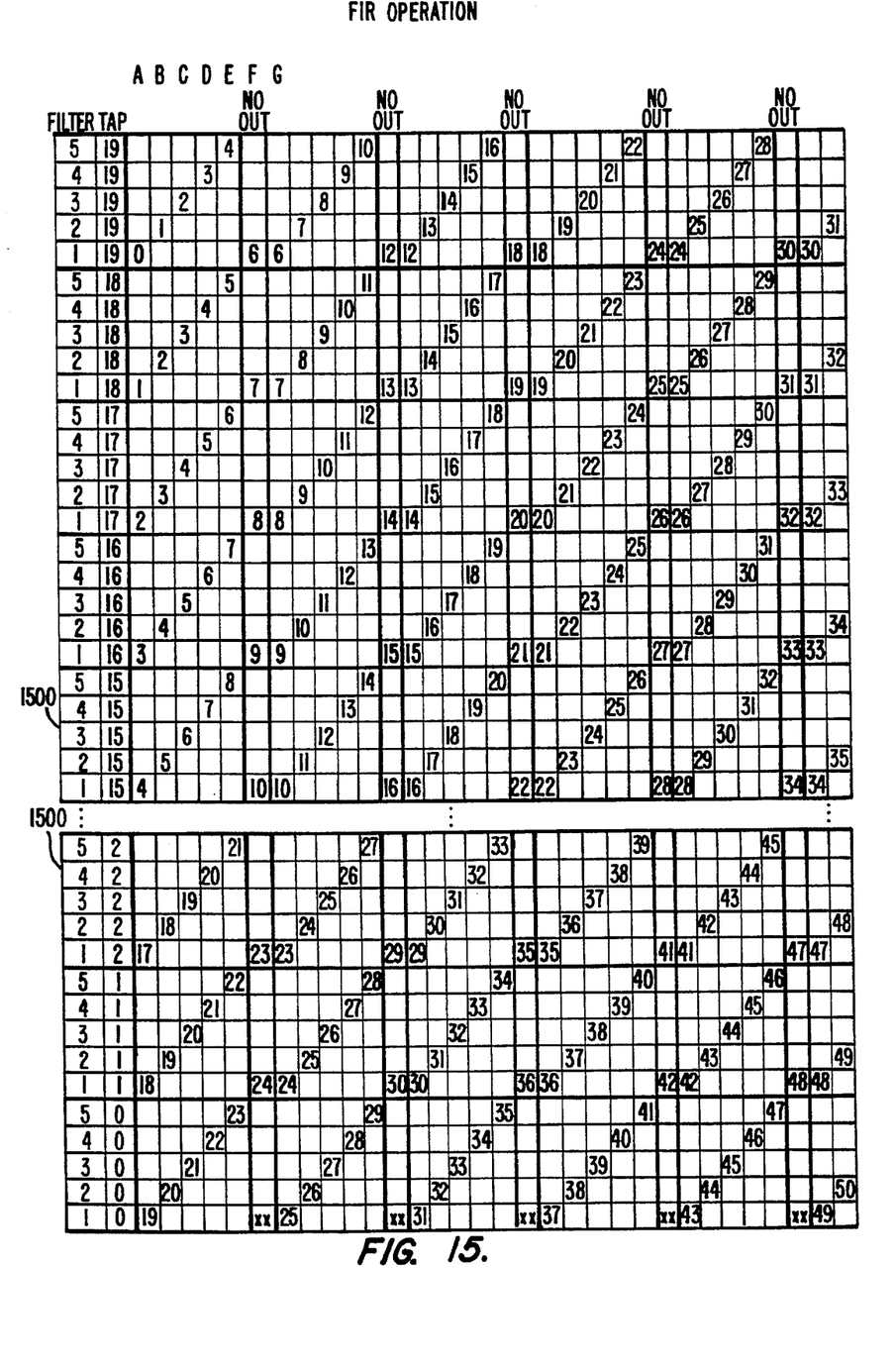
FIG. 15 is a table depicting in simplified form the operation of an equalizer in accordance with the invention.

FIG. 15 is a table 1500 depicting in simplified form the operation of equalizer 414 in accordance with the invention. Table 1500 illustrates the movement of samples through the five complex filters of equalizer 414 and how output data is resampled to 1 sample per symbol. For simplicity, only real samples are shown although the actual samples are complex. Each column of table 1500 represents the contents of the various tap elements of the filters at successive input sample periods. Each row corresponds to a particular tap element of a particular one of the five filters as identified by the columns marked "filter" and "tap". Each bold horizontal line delimits between physical tap elements as depicted in FIG. 14. The vertical position of a sample between a pair of bold horizontal lines indicates the coefficient currently selected. The numbers represent the time-ordered values, the higher numbers representing data occurring later in time.

Figure 16:
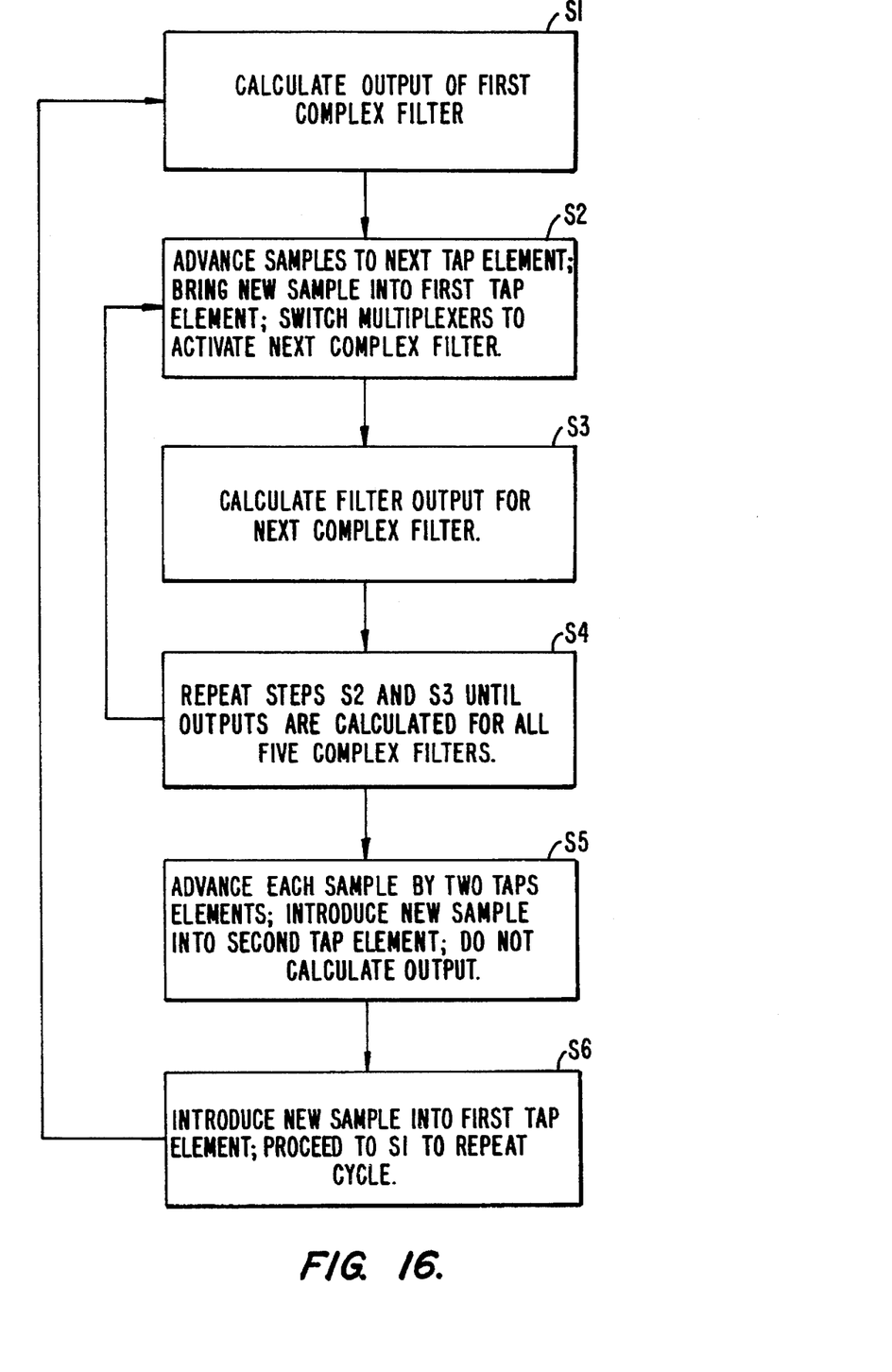
FIG. 16 is a flowchart describing steps of the operation of an equalizer in accordance with the invention.

FIG. 16 is a flowchart describing steps of the operation of equalizer 414 in accordance with the invention. Step S1 occurs during the sample period denoted by column A in FIG. 15. At step S1, the output of the first of the five complex filters is calculated for output by equalizer by controlling the multiplexers to select the first coefficient, marked as "1" in the filter column for multiplication by the contents of each tap element. Prior to the next sample period, at step S2, each sample within the filter is advanced to the next tap period, a new sample is introduced into the first tap element, and the coefficients for the next complex filter are selected Thus in column "B" the number "20" corresponds to a new sample placed in the first tap element "0". Also, all the numbers in column B are in the rows marked as filter "2" to signify that this filter has been selected. At step S3, the output of the next complex filter is calculated. At step S4, steps S2 and S3 are repeated until an output for each of the five complex filters has been calculated.

At step S5, corresponding to the sample period denoted by column F in FIG. 15, each sample within the filter is advanced by two tap elements and a new sample is introduced into the second tap element. New sample "24" is shown in the tap marked as "1". No filter output is calculated within this sample period so the selection of coefficients is not relevant. At step S6, a new sample is introduced into the first tap element with no further shifting of old samples. Equalizer operation then proceeds to step S1 and the cycle repeats. Equalizer 414 therefore achieves the necessary resampling since output data is generated during only five of every six input sample periods. Those of skill in the art will appreciate that shifting of data through the filter could be coordinated with input in many different ways to achieve the necessary resampling while maintaining even flow of data.

FIG. 15 can also be understood as depicting the operation of an alternative embodiment wherein equalizer 414 is implemented as a single 100 tap FIR filter with each tap having a fixed coefficient. Each horizontal row in FIG. 15 then represents a single tap element. Samples advance by six taps prior to the first five of each six sample periods and not at all prior to the sixth. During these five sample periods, an output of the 100 tap filter is calculated for the tap elements currently holding samples. During the sixth sample period, equalizer 414 does not produce an output. The first six tap elements take turns in accepting new samples.

Symbol decision stage 420 may be implemented in accordance with well-known techniques. The I-channel and Q-channel outputs of carrier recovery stage 418 are the inputs to symbol decision stage 420. The outputs of symbol decision stage 420 are the recovered symbols, carrier phase error measurements for use by carrier recovery stage 418, and equalizer error measurements for use by weight updating stage 416.

Carrier recovery stage 418 may also be implemented in accordance with well-known techniques. Carrier recovery stage 418 removes residual frequency modulation from the output of equalizer 414 using phase error estimates provided by symbol decision stage 420. One source of the residual frequency modulation is non-ideal performance by local oscillators used to downconvert to the IF. Another function of carrier recovery stage 418 is to reapply residual frequency modulation to the equalizer error output of symbol decision stage 420 so that equalizer coefficients are optimized for the phase-uncorrected data travelling through equalizer 414.

Figure 17:
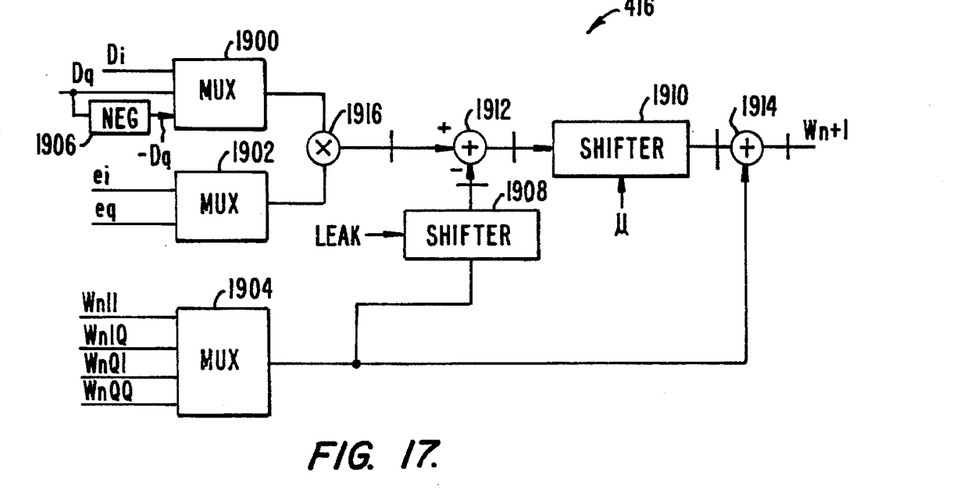
FIG. 17 depicts a weight updating stage in accordance with the invention.

FIG. 17 depicts weight updating stage 416 in accordance with the invention. Weight updating stage 416 includes first, second, and third multiplexers 1900, 1902, and 1904, complementing unit 1906, first and second shifters 1908 and 1910, first and second summers 1912 and 1914, and multiplier 1916. Weight updating stage 416 essentially implements the following equations to update the coefficients for equalizer 416 responsive to the error signals obtained from an equalizer error ROM.

$$W_{n+1}II = W_nII + \mu[D_i e_i - L(W_n II)] \quad (5)$$

$$W_{n+1}QQ = W_nQQ + \mu[D_q e_q - L(W_n QQ)] \quad (6)$$

$$W_{n+1}IQ = W_nIQ + \mu[D_i e_q - L(W_n IQ)] \quad (7)$$

$$W_{n+1}QI = W_nQI + \mu[-D_q e_i - L(W_n QI)] \quad (8)$$

Thus, in accordance with the invention, the filter coefficients are updated independently for the I-channel and for the Q-channel. The one complex sample period misalignment between the I-channel and Q-channel introduced by quadrature direct conversion stage 408 is effectively handled as a channel distortion error which equalizer 414 is adapted to correct.

The new value for a particular filter coefficient thus depends on the former value for that coefficient, the data value by which the former coefficient was multiplied, and the equalizer error output from symbol decision stage 420 which resulted from the filter calculation as a whole. Since each filter structure depicted in FIG. 14 employs five independent sets of coefficients, care must be taken to update each set of coefficients with error data resulting from the set. Also, to avoid data inconsistency, a particular set of coefficients should not be updated while in use.

In operation, control signals to multiplexers 1900, 1902, and 1904 determine which filter from FIG. 13 is to be updated. Multiplier 1916, summers 1912 and 1914, and shifters 1908 and 1910 calculate the new coefficients in accordance with the appropriate equation.

The invention has now been explained with reference to specific embodiments. Other embodiments will be apparent to those of ordinary skill in the art in view of the foregoing description. For example, the baud rate, sampling rate and IF center frequency could be varied. Other non-integer ratios of sampling frequency to symbol rate could be selected. Furthermore, the techniques described here are not restricted to QAM but are applicable to any modulation scheme which makes use of both an in-phase and quadrature component. It is therefore not intended that this invention be limited except as indicated by the appended claims.

What is claimed is:

1. Apparatus for demodulating an IF signal having in-phase and quadrature modulation components carrying data having a baud rate, $F_B$, said apparatus comprising:

a bandpass sampler that receives the IF signal and provides an output sample stream having a sample rate $\hat{F}_s$, $\hat{F}_s$ being approximately equal to $(2*N*K/L)*F_B$ where $2*L>K>L$, and K, L and N are integers;

a quadrature converter that recovers an in-phase component sampled signal and a quadrature component sampled signal from the output sample stream, the in-phase and quadrature components both being centered at 0 Hz and having sample rates of $\hat{F}_s/2$; and a resampler that receives samples of the in-phase component sampled signal and the quadrature component sampled signal and provides corresponding signals sampled at $F_s$, where $F_s$ is equal to exactly $K/L*F_B$, responsive to a recovered measurement of $F_B$.

2. The apparatus of claim 1 further comprising:

an equalizer that receives the in-phase component sampled signal and the quadrature component sampled signal provided by the resampler and corrects channel distortion errors, said equalizer having a feedback input and in-phase and quadrature outputs, both outputs sampled at $F_B$; and a symbol decoder that translates the in-phase and quadrature signal outputs of said equalizer into estimates of transmitted data and for driving the feedback input of the equalizer with error signals derived from the in-phase and quadrature signal outputs of said equalizer and the estimates of the transmitted data.

3. The apparatus of claim 1 wherein the output sample stream has a spectrum centered at approximately $F_s/4$ and wherein said quadrature converter obtains the in-phase component sampled signal and the quadrature component sampled signal by multiplying the output sample stream by first and second sinusoidal signals having a 90 degree phase difference therebetween and a frequency $\hat{F}_s/4$, the peaks of said first and second sinusoidal signals being aligned to samples of the output sample stream.

4. The apparatus of claim 1 wherein said resampler comprises:

an adjustable interpolator that interpolates the previously sampled signal by an adjustable factor N to generate a corresponding interpolated signal;

a decimator that decimates the interpolated signal by a fixed factor M to generate the resampled signal; and a symbol timing phase lock loop for controlling the variable factor N of said adjustable interpolator responsive to a baud rate measurement recovered from the resampled signal.

5. Apparatus for generating a resampled signal from a previously sampled signal, wherein the sampled signal is encoded with data, the resampling rate is a fractional multiple of a data rate of the sampled signal, and the sampling rate is an approximation of an integer multiple of the resampling rate, said apparatus comprising:

an adjustable interpolator that interpolates the previously sampled signal by a variable factor N to generate a corresponding interpolated signal;

a first decimator that decimates the interpolated signal by a predetermined factor M to generate the resampled signal; and a symbol timing phase lock loop that receives the resampled signal and generates a control signal that controls the variable factor N of said adjustable interpolator responsive to a baud rate measurement recovered from the resampled signal, said symbol timing phase lock loop comprising:

a non-linear device that applies a non-linearity to the resampled signal and provides an output having a frequency component at the baud rate and aliases thereof including a first alias;

a second decimator that receives the output of the non-linear device and provides an output having a second alias of the first alias;

a third decimator that receives the output of the second decimator and provides an output having a third alias of the second alias, the third alias being at approximately 0 Hz; and a loop filter that controls the interpolation rate of said adjustable interpolator to force the third alias to exactly 0 Hz.

6. The apparatus of claim 5 wherein said adjustable interpolator accommodates a non-integer value of N by varying an integer interpolation rate over time to have a median value of N.

7. The apparatus of claim 5 wherein the non-linearity is an absolute value function.

8. The apparatus of claim 2 wherein said equalizer comprises:

an FIR filter structure that accepts in-phase and quadrature inputs and provides in-phase and quadrature outputs, said FIR filter structure comprising:

a first FIR filter that accepts the in-phase input and provides as an output a component of the in-phase output responsive to the in-phase input;

a second FIR filter that accepts the quadrature input and provides as an output a component of the in-phase output corresponding to the quadrature input;

a first summer that accepts the output of said first FIR filter and of said second FIR filter and provides the in-phase output of said FIR filter structure;

a third FIR filter that accepts the in-phase input and provides as an output a component of the quadrature output corresponding to the in-phase input;

a fourth FIR filter that accepts the quadrature input and provides as an output a component of the quadrature output corresponding to the quadrature input; and a second summer that accepts the output of said third FIR filter and of said fourth FIR filter and provides the quadrature output of said FIR filter structure; and wherein each of said first, second, third, and fourth FIR filters comprise a chain of R linked tapped delay elements, each linked tapped delay element operative to multiply a selected one of L coefficients by an input sample stored within the tapped delay element responsive to a coefficient selection signal; and an output controller that, for every consecutive group of K input sample periods, controls each linked tapped delay element to multiply during a selected group of L of the K successive sample periods, thereby causing the FIR filter structure to provide an in-phase and quadrature output during said selected group of L sample periods and to provide no output during the remaining ones of the K sample periods, said output controller also generating the coefficient selection signal so as to rotate each tapped delay element through the L coefficients during the selected group of L sample periods.

9. The apparatus of claim 8 wherein the filter coefficients are adapted responsive to the feedback signal generated by said symbol decoder.

10. The apparatus of claim 9 wherein the coefficients of said first, second, third, and fourth filters are adapted independently.

11. In a sampled data communication system, an equalizer receiving input samples at a sampling rate of K/L samples per symbol and providing output samples at a sampling rate of 1 sample per symbol, said equalizer comprising:

an FIR filter including a plurality of linked tapped delay elements, each linked tapped delay element operative to multiply a selected one of L coefficients by an input sample stored within the tapped delay element responsive to a coefficient selection signal, the FIR filter receiving the input samples and providing the output samples of said equalizer; and an output controller that, for every consecutive group of K input sample periods, controls each linked tapped delay element to multiply during a selected group of L of the K successive sample periods, thereby causing the FIR filter structure to provide an output sample during said selected group of L sample periods and to provide no output during the remaining ones of the K sample periods, said output controller also generating the coefficient selection signal so as to rotate each tapped delay element through the L coefficients during the selected group of L sample periods.

12. The equalizer of claim 11 wherein said output samples and input samples are complex.

13. In a sampled data system, an equalizer receiving input samples at a sampling rate of K/L samples per symbol and providing output samples at a sampling rate of 1 sample per symbol, said equalizer comprising:

a plurality of tapped delay elements linked together in a line to form an FIR filter, each said tapped delay element comprising a storage element, a multiplier, and a multiplexer for selecting from among L FIR coefficients;

a multiplexer controller that generates a control signal for the multiplexers of the tapped delay elements and that rotates through the L coefficients of each multiplexer during the selected group of L sample periods; and an output controller that calculates an FIR filter output during the first L sample periods and that inhibits output during the remaining K-L sample periods.

14. The adaptive equalizer of claim 13 wherein said input samples, output samples and coefficients of said FIR filter are complex.

* * * * *